(12) United States Patent
Alhijji et al.

(10) Patent No.: US 12,481,290 B1
(45) Date of Patent: Nov. 25, 2025

(54) SYSTEM AND METHOD FOR AUTONOMOUS VEHICULAR DEVELOPMENT AND OPERATION

(71) Applicant: KING SAUD UNIVERSITY, Riyadh (SA)

(72) Inventors: Saleh Mohammed Alhijji, Riyadh (SA); Talal Sultan Alowaid, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 19/213,966

(22) Filed: May 20, 2025

(51) Int. Cl.
*G05D 1/224* (2024.01)
*B60W 40/09* (2012.01)
*B60W 50/08* (2020.01)

(52) U.S. Cl.
CPC .......... *G05D 1/2249* (2024.01); *B60W 40/09* (2013.01); *B60W 50/082* (2013.01); *G05D 1/2242* (2024.01); *B60W 2540/221* (2020.02)

(58) Field of Classification Search
CPC .. B60W 40/09; B60W 50/082; G05D 1/2249; G05D 1/2242
See application file for complete search history.

(56) References Cited

U.S. PATENT DOCUMENTS

| | | | |
|---|---|---|---|
| 4,855,822 A | 8/1989 | Narendra et al. | |
| 5,456,604 A | 10/1995 | Olmsted et al. | |
| 5,865,624 A | 2/1999 | Hayashigawa | |
| 6,584,382 B2 * | 6/2003 | Karem | G05D 1/0016 701/3 |
| 8,649,918 B2 * | 2/2014 | Stuckman | A63H 27/02 446/454 |
| 10,095,226 B1 * | 10/2018 | Stuckman | B64C 39/024 |
| 2013/0302760 A1 | 11/2013 | Welles | |

OTHER PUBLICATIONS

Sportillo, Daniele, Alexis Paljic, and Luciano Ojeda. "Get ready for automated driving using virtual reality." Accident Analysis & Prevention 118 (2018): 102-113. (Abstract).
Yu, Yang, and Sanghwan Lee. "Remote driving control with real-time video streaming over wireless networks: Design and evaluation." IEEE Access 10 (2022): 64920-64932.

\* cited by examiner

*Primary Examiner* — Luke Huynh
(74) *Attorney, Agent, or Firm* — Nath, Goldberg & Meyer; Joshua B. Goldberg (57) ABSTRACT

A system and method for developing and using an autonomous vehicle driving model includes using a small-scale remote-controlled (RC) vehicle for training an autonomous vehicle driving model to operate a vehicle on the road. The RC vehicle may be equipped with a camera on a gimbal, that can be turned based on the head movements of a driver operating the RC vehicle from a remote controlling station, and with a plurality of sensors that include force feedback sensors, an IMU, etc. Physiological data can be obtained by the driver while the driver remotely operates the RC vehicle via one or more physiological sensors monitoring the driver's heartbeat rate, blood pressure, head and body movements, etc., The autonomous vehicle driving model can be developed by correlating the driver's physiological state with the driving of the RC vehicle.

19 Claims, 3 Drawing Sheets

SYSTEM AND METHOD FOR AUTONOMOUS VEHICULAR DEVELOPMENT AND OPERATION

TECHNICAL FIELD

The present disclosure relates to autonomous vehicles, and more particularly, to a system and method for autonomous vehicle development and operation.

DISCUSSION OF THE RELATED ART

The development of autonomous vehicles presents significant challenges in the transportation industry. Current methods for testing and developing autonomous systems typically rely on two primary approaches for developing autonomous driving systems: computer simulations and full-scale vehicle testing.

Computer simulations, while safe and cost-effective, often struggle to accurately model the complexities of real driving scenarios, particularly human behavior and decision-making processes. They lack the ability to capture the nuanced physiological responses of human drivers in various driving conditions.

Full-scale vehicle testing offers high fidelity but comes with substantial economic costs, safety risks, and logistical challenges. It also presents difficulties in repeatedly testing specific scenarios or edge cases, and in capturing detailed physiological data from drivers in a controlled yet realistic environment.

SUMMARY

The present disclosure relates to a system and method for developing an autonomous driving model and using the same to autonomously drive a vehicle on the road. The system and method disclosed in this specification utilizes a remote-controlled (RC) vehicle (which is a small vehicle, typically too small to fit a person inside) for providing data essentially as reliable as data obtained from a full-sized vehicle for developing an autonomous vehicle driving model while providing a low cost, reduced safety risks, and the flexibility of computer simulation. This is because it is significantly cheaper to operate a small-scale RC vehicle for obtaining data to develop an autonomous vehicle driving model than to operate a full-sized vehicle.

In addition, the present subject matter includes obtaining physiological data from the operator (or driver) of the RC vehicle while the driver drives the RC vehicle in the development stage of the autonomous vehicle driving model. The physiological data obtained from the driver is used for integrating human decision-making factors and/or driving preferences in the development of the autonomous vehicle driving model of the present subject matter. Therefore, the autonomous vehicle driving model of the present specification can then be used to autonomously drive a vehicle in a more human-like fashion.

BRIEF DESCRIPTION OF THE DRAWINGS

The above and other features of the present disclosure will become more apparent by describing in detail exemplary embodiments thereof in conjunction with the accompanying drawings, in which.

DETAILED DESCRIPTION OF THE EMBODIMENTS

Exemplary embodiments of the present disclosure will be described more fully hereinafter with reference to the accompanying drawings. The present disclosure may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" may include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

Unless defined otherwise, all technical and scientific terms used herein have the same meaning as commonly understood to one of ordinary skill in the art to which the presently described subject matter pertains.

Where a range of values is provided, for example, percentage ranges or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Figure 1:
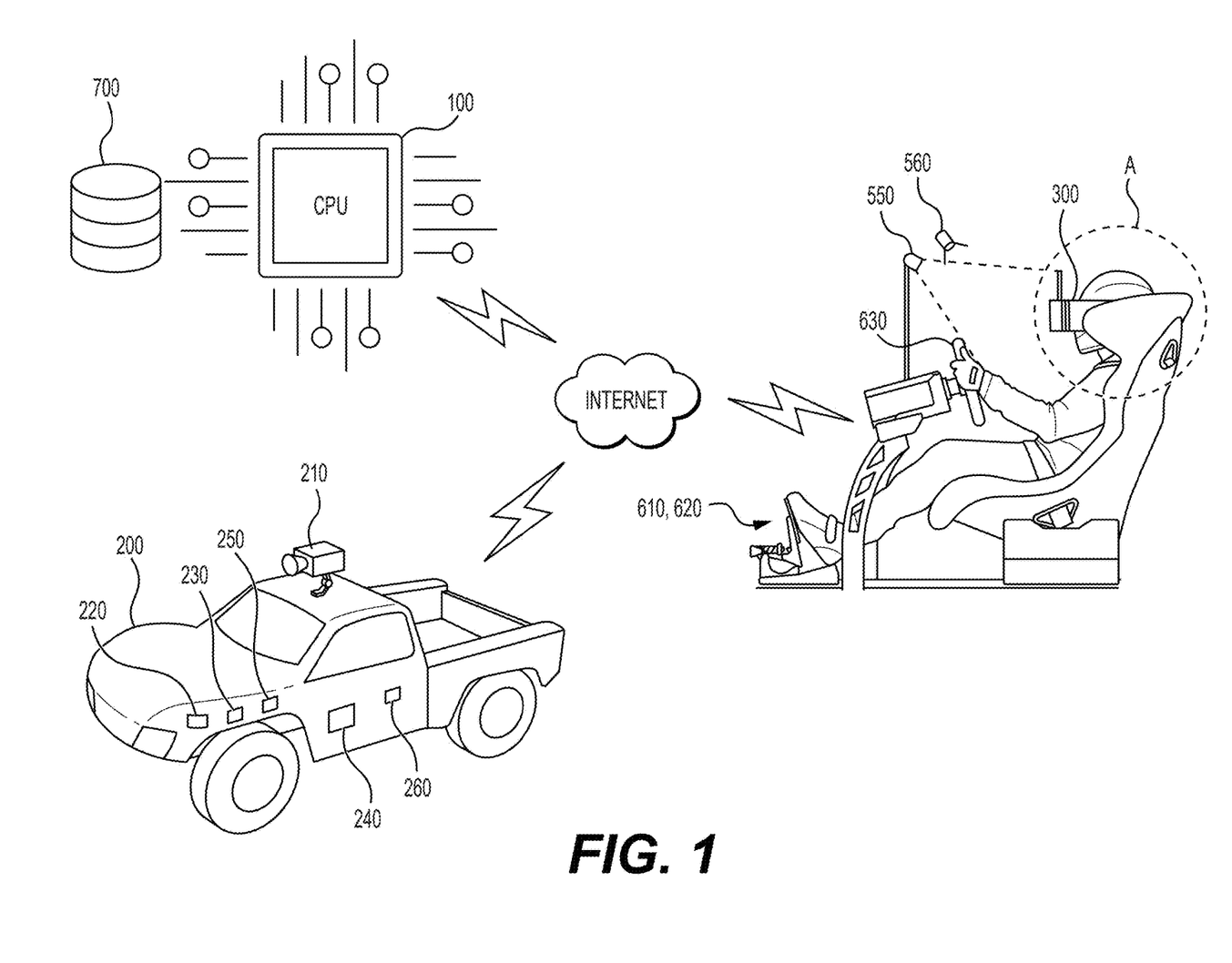
FIG. 1 is a diagram illustrating an autonomous vehicle system according to an embodiment of the present subject matter.
Figure 2:
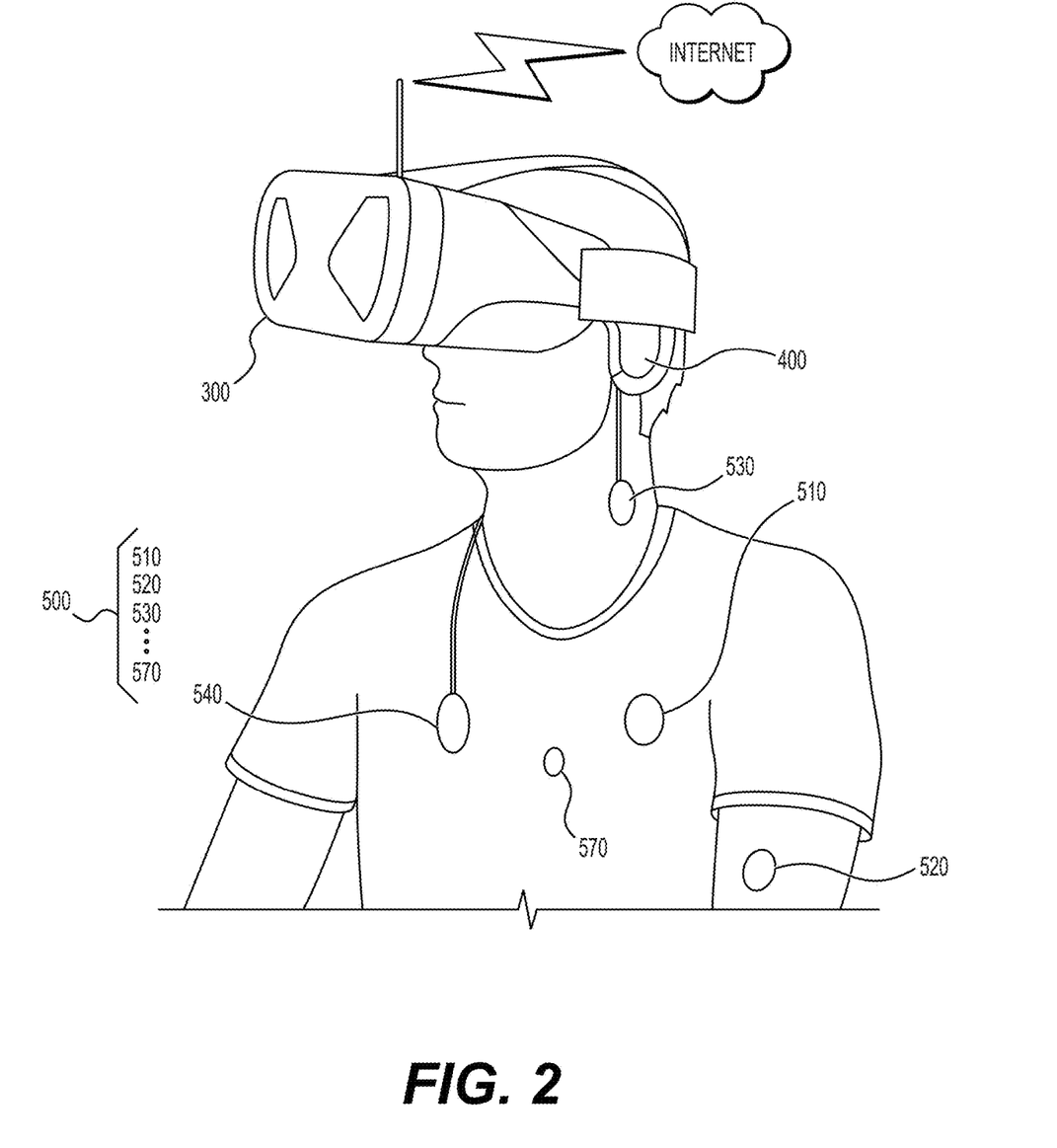
FIG. 2 is a perspective view illustrating a driver depicted in portion A of FIG. 1.

FIGS. 1-2 illustrate an autonomous vehicle system according to an embodiment. The system of FIGS. 1-2 can be used to develop an autonomous vehicle driving model. The autonomous vehicle driving model, once developed, can be used to drive a vehicle on the road.

A method for developing an autonomous vehicle driving model in accordance with the present subject matter will be described below with reference to FIG. 3. A method for using the autonomous vehicle driving model to operate a vehicle on the road will also be described below.

An aspect of the system and method of the present specification is the obtaining and accounting of physiological data from an operator of a small-scale remote-control (RC) vehicle during the process of developing an autonomous driving model. The operator of the RC vehicle may also be referred to as a "driver." Once developed, the autonomous driving model can be used to autonomously operate a full-sized vehicle in a more human-like fashion. This is because an autonomous driving model of the present subject matter is trained to consider the human aspect of driving in its decision-making process required to operate a vehicle on the road autonomously, that is, to consider how the driver whose physiological data was used to train the autonomous driving model would have behaved (driving-wise) under the set of driving circumstances that surround the vehicle being operated by the autonomous driving model.

Different drivers can be used to train different autonomous driving models. For example, a first driver that prefers a sedated driving experience can be used to train (and therefore, develop), a first autonomous driving model. The first autonomous driving model can be named, for example, "relaxed driving." A second driver that prefers a spirited driving experience can be employed to train a second autonomous driving model. The second autonomous driving model can be named, for example, "spirited driving." A race car driver can be employed to produce a "race driving" autonomous driving model, and so on.

An operator of a full-sized vehicle can select a desired autonomous driving model based on operator preference. For example, an operator of a full-sized vehicle can select the "race driving" autonomous driving model when desiring the autonomous driving model to drive a full-sized vehicle very quickly.

Another aspect of the present subject matter is the utilization of an RC vehicle for gathering driving data used to develop an autonomous driving model. Driving data obtained from a multitude of sensors placed on the RC vehicle can be used to train an autonomous driving model to accurately drive a vehicle on the road. The sensor data obtained by the sensors of the RC vehicle during the training phase of the model can produce a robust autonomous driving model since said sensor data is derived from actual sensors. On the other hand, autonomous driving models developed solely by computer simulation, i.e., by driving a virtual vehicle on a virtual driving track, generally do not drive a vehicle on the road as well as a driving model developed by using actual sensor data reflective of the physics at play when a vehicle is driven on the road.

In addition, an autonomous driving model of the present subject matter can be used to drive a vehicle autonomously (e.g., in a full autonomous mode), or semi-autonomously. In the full autonomous mode, the autonomous driving model can operate a vehicle on the road entirely by itself.

In the semi-autonomous mode, the driver can be considered the primary operator of a vehicle, but the autonomous driving model can be used to adjust the driving inputs of the driver for controlling the operation of the vehicle being driven. For example, in the semi-autonomous mode, the autonomous driving model can be used to adjust the throttle response (as input by the throttle that is controlled by the driver) to make the throttle more responsive or less responsive, to smoothen out jerks in the steering introduced by the driver, etc.

While an autonomous driving model developed in accordance with the present subject matter can be used to drive a vehicle on the road, it can also be used to drive (or operate) a vehicle in a virtual environment (e.g., computer simulation). For example, an autonomous driving model of the present subject matter can be used to drive a virtual vehicle on a virtual driving track, in the full autonomous mode and in the semi-autonomous driving mode.

Since an autonomous driving model of the present subject matter can be used to record driving data while a driver operates an RC vehicle on a driving track (the driving data is used to train the autonomous driving model) the recorded driving data can also be used to play back the driver's performance on a full-sized vehicle on the road or on a virtual vehicle being driven on a virtual driving track.

With reference to FIGS. 1-2, an autonomous vehicle system includes a processor 100, a remotely-controlled (RC) vehicle 200, the RC vehicle being smaller in size than a full-sized vehicle, a camera 210 mounted on the RC vehicle, at least one sensor selected from the group consisting of a proximity sensor 220, a localization sensor 230, an inertial measurement unit (IMU) sensor 240, a force feedback sensor 250 and a microphone 260 included in the RC vehicle 200, a head-mountable display 300 configured to be worn by a first driver, the head-mountable display 300 being configured to display video data obtained from the camera 210, a pair of headphones 400 configured to be worn by the first driver, at least one physiological sensor 500 configured to obtain physiological data from the first driver, a throttle pedal 610, a brake pedal 620 and a steering wheel 630 configured to remotely operate the RC vehicle 200.

The autonomous vehicle system may also include a database 700. The database 700 may include a non-transitory, tangible program storage medium, embodying a program of instructions executable by the processor 100 to perform method steps for autonomous vehicular operation.

The RC vehicle 200 may be smaller in size than a full-sized vehicle. A full-sized vehicle can be, without limitation, a vehicle designed to carry or transport at least one person. For example, a full-sized vehicle may be a vehicle that a general member of the public considers to be a sedan, a coupe, a pickup truck, a sport utility vehicle (SUV), a crossover, etc., as the case may be, as contrasted from an RC vehicle, which is typically considered too small to accommodate person(s) inside and/or to be driven by a person.

In an approach, the RC vehicle 200 may correspond to a full-sized vehicle. In a non-liming example, when a full-sized vehicle operable by the autonomous system and method of the present subject matter is a sedan, the RC vehicle 200 may be a miniature version of the sedan (e.g., the RC vehicle 200 may correspond to the sedan in resemblance, and the sedan may correspond to the RC vehicle 200 in resemblance). As another non-limiting example when a full-sized vehicle operable by the autonomous system and method of the present subject matter is a truck, the RC vehicle 200 may be a miniature version of the truck (e.g., the RC vehicle 200 may correspond to the truck in resemblance, and the truck may correspond to the RC vehicle 200 in resemblance).

However, the present subject matter need not be read narrowly to require the RC vehicle 200 and the full-sized vehicle to resemble one another visually. In an approach, the RC vehicle 200 may simply be a small-scaled vehicle, regardless of whether it visually resembles the full-sized vehicle that can be driven by an autonomous vehicle driving model as described in this specification.

As illustrated in FIG. 1, the first driver can be seated in a seat that is remote from the RC vehicle 200. The throttle pedal 610, the brake pedal 620 and the steering wheel 630 to be physically manipulated by the first driver can be disposed at a predetermined distance (e.g., a comfortable distance) from the seat where the first driver is seated. For example, the throttle pedal 610, the brake pedal 620 and the steering wheel 630 can be located remotely from the RC vehicle 200.

As illustrated in FIG. 1, the RC vehicle 200, the throttle pedal 610, the brake pedal 620, the steering wheel 630, the proximity sensor 220, the localization sensor 230, the IMU 240, the force feedback sensor 250, the microphone 260, the head-mountable display 300, the headphones 400, the at least one physiological sensor 500, the processor 100 and the database 700 may be wirelessly connected to one another (e.g., via the internet, via a radio frequency band, etc.). Alternatively, the components indicated in this paragraph may be connected to one another by wire.

The at least one physiological sensor 500 may include an electrocardiography (ECG) sensor 510 to obtain the first driver's heartbeat rate, a photoplethysmography (PPG) sensor or a piezoelectric silicon pressure sensor 520 (e.g., a micro-electro-mechanical system (MEMS) pressure sensor) to obtain the first driver's blood pressure level, a thermometer 530 to obtain the first driver's temperature, a humidity sensor 540 to detect the first's driver's perspiration level, a millimeter wave (mmWave) sensor 550 for determining an orientation of the head of the first driver, a camera 560 for tracking for tracking movements of the head and/or body of the first driver and/or a strain gauge sensor 570 for monitoring a respiration of the first driver. Any combination of these various physiological sensors 500 can be used.

Video and/or image feed from the camera 210 can be displayed to the first driver via the head-mountable display 300. The camera 210 may be mounted on a gimbal, the gimbal connecting the camera 210 to the RC vehicle 200. The camera 210 can be oriented by the gimbal in accordance with an orientation of the first driver's head, as detected by using the mmWave sensor 550 and/or the camera 560.

For example, when the first driver turns their head to the left, the camera 210 can be turned to the left relative to its previous orientation (which can be calibrated to initially point straight toward the front of the RC vehicle 200). When the driver tilts or turns their head to the right, the camera 210 can be tilted or turned to the right, and so on. Therefore, the camera 210 with the gimbal can be used to provide the first driver with a digital version of the view that the first driver would have seen had the first driver been sitting in the RC vehicle 200 when the RC vehicle 200 is driven.

The steering wheel 630 may include a motor or actuator configured to provide haptic feedback (e.g., vibration) to the first driver based on the driving of the RC vehicle. For example, data obtained from the force feedback sensor 250 (which may be mounted to the steering components that connect the front wheels of the RC vehicle 200 to the body of the RC vehicle 200) may be used to provide the haptic feedback to the first driver via the motor or actuator connected to the steering wheel 630. This configuration provides for a realistic driving experience where forces acting on the steering components of the RC vehicle 200 (e.g., forces on the steering of the RC vehicle 200 resulting from the RC vehicle 200 driving over a bump, mounting a curb, etc.,) can be transmitted to the first driver for a more realistic driving experience.

In addition, sounds (or noise) emitted by/near the RC vehicle 200, as captured by the microphone 260, can be transmitted to the first driver via the headphones 400 for a more realistic driving experience.

Figure 3:
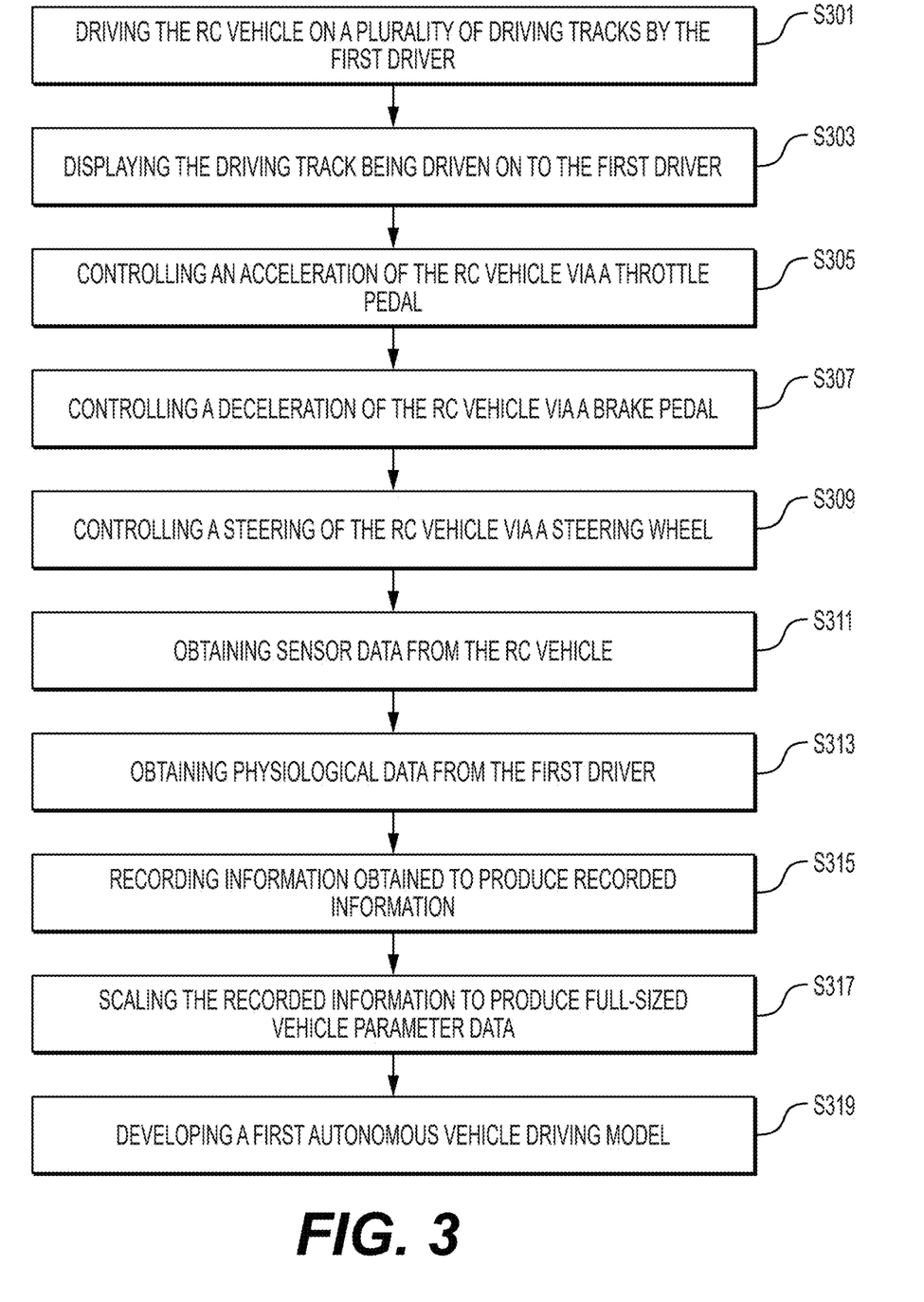
FIG. 3 is a flowchart illustrating an autonomous vehicle method according to an embodiment of the present subject matter.

FIG. 3 illustrates method steps of an autonomous vehicle method in accordance with the present subject matter. The method of FIG. 3 can be used in conjunction with the system of FIGS. 1-2 to develop an autonomous vehicle driving model.

More specifically, the method of FIG. 3 pertains to the generation of an autonomous vehicle driving model. Once generated, the autonomous vehicle driving model can be used to operate a full-sized vehicle on the road or to operate a digital vehicle on a digital road (in a computer-based driving simulation), as will be described below. The hardware described with reference to the system of FIGS. 1-2 can be used to operate a digital vehicle on a digital road.

Referring to FIG. 3, the method includes driving the RC vehicle 200 on a plurality of driving tracks by the first driver (step S301). Step S301 may include the first driver driving the RC vehicle 200 a plurality of times on each driving track of the plurality of driving tracks. At a minimum, step S301 includes driving the RC vehicle 200 at least once on at least one driving track of the plurality of driving tracks.

Each driving track used in step S301 can be a closed loop (e.g., a continuous track) or a driving path that has a start and an end (e.g., not a loop). Each driving track of the plurality of driving tracks used in step S301 may be, for example, a driving course that is modeled after inner city roads, highways, rural roads, intersections, curves, roundabouts, etc., for autonomous vehicle training. Since the RC vehicle 200 may be smaller than a full-sized vehicle, the plurality of driving tracks utilized in step S301 may be appropriately sized to fit the RC vehicle 200 thereon. For example, miniature models of roads, intersections, roundabouts, etc., can be manufactured for driving the RC vehicle 200 thereon.

However, the driving tracks utilized in step S301 can also be roads/highways/intersections, racetracks etc., built for full-sized vehicles.

When the RC vehicle 200 is driven on a driving track from among the plurality of driving tracks by the first driver, the method includes:

a) displaying the driving track being driven on to the first driver via the head-mountable display 300 (step S303).
  Video data obtained from the camera 210 mounted on the RC vehicle 200 can be used to display the driving track to the first driver via the head-mountable display 300;

b) controlling an acceleration of the RC vehicle 200 via the throttle pedal 610 (step S305);

c) controlling a deceleration of the RC vehicle 200 via the brake pedal 620 (S307);

d) controlling a steering of the RC vehicle 200 via the steering wheel 630 (S309);

e) obtaining sensor data from the RC vehicle 200 by using the proximity sensor 220, the localization sensor 230, the IMU sensor 240, the force feedback sensor 250 and/or the microphone 260 included in the RC vehicle 200 (step S311);

f) obtaining physiological data from the first driver while the first driver drives the RC vehicle 200 (S313);

g) recording: the video data obtained from the camera 210, a position of the throttle pedal 610 and the acceleration of the RC vehicle 200, a position of the brake pedal and the deceleration of the RC vehicle obtained by using the brake pedal 620, a position of the steering wheel obtained by using the steering wheel 630, the obtained sensor data from the RC vehicle and the obtained physiological data (all of which may vary during time as the first driver operates the RC vehicle 200) to produce recorded information (step S315). The recording of the data described in this paragraph can be performed simultaneously (for all the listed sensors) and in real-time while the RC vehicle 200 is driven on a driving track;

h) scaling the recorded information produced in step S315 by accounting for differences in physics and/or dynamics between the RC vehicle 200 and the full-sized vehicle intended to be operated autonomously or semi-autonomously to produce full-sized vehicle parameter data (step S317). The full-sized vehicle can be used to transport humans and/or cargo and can be operated by using an autonomous vehicle driving model trained as taught in this specification. The full-sized vehicle can be of a predetermined size, weight, etc.; and i) developing a first autonomous vehicle driving model by taking as input the produced recorded information of step S315 and the produced full-sized vehicle parameter data of step S317, and correlating the acceleration of the RC vehicle 200 via the throttle pedal 610, the deceleration of the RC vehicle 200 via the brake pedal 620 and the steering of the RC vehicle 200 via the steering wheel 630 with the obtained physiological data from the first driver and with the produced full-sized vehicle parameter data (step S319).

The first autonomous vehicle driving model produced when carrying out step S319 is configured to drive the full-sized vehicle on a driving track in consideration of a driving style or manner of the first driver, said driving track on which the full-sized vehicle is configured to be driven on is sized to fit the full-sized vehicle thereon.

Alternatively, or in addition, the first autonomous vehicle driving model is configured to drive a digital vehicle on a digital driving track in consideration of the driving style or manner of the first driver by using the first autonomous vehicle driving model.

For example, in an App that simulates vehicular driving based on a created digital model of a vehicle and a created digital track on which the digital vehicle can be driven on, the first autonomous vehicle driving model can be utilized to drive the digital vehicle (e.g., a digital representation of the RC vehicle 200 or a digital representation of another vehicle) on the digital driving track in consideration of the driving style or manner of the first driver.

The scaling of the recorded information in step S317 may include scaling up the size of the plurality of driving tracks based on a size difference between the RC vehicle 200 and the full-sized vehicle that the first autonomous driving model is configured to operate.

In addition, the scaling of the recorded information in step S317 may include scaling the forces that would impact the full-sized vehicle when driven in light of the size, weight and other physical differences between the RC vehicle 200 and the full sized vehicle. Stated otherwise, step S317 may include scaling (e.g., scaling up) forces that would impact the full-sized vehicle when the full-sized vehicle is driven like the RC vehicle. This is because the physical configuration of the RC vehicle 200 is known (e.g., the size, weight, suspension characteristics, turning radius, etc., of the RC vehicle 200 are known, or predetermined). In addition, the physical configuration of the corresponding full-sized vehicle (e.g., the full-sized vehicle that will be operated by the system and method of the present specification) is also known. That is, the size, weight, suspension characteristics, turning radius, etc., of the full-sized vehicle are known (or predetermined).

The development of the first autonomous vehicle driving model in step S319 includes considering the first driver's driving style, which includes correlating the first's driver's physiological data obtained during driving and the resulting driving, that is, the manner in which the first driver accelerates, decelerates, maintains velocity and steers in response to the vehicle's position on the road, and the road's configuration (that is, based on what the road ahead looks like, including whether the road ahead is curved, straight, flat, on an incline, on a decline, the lateral cross-section of the road, etc.) the weather, etc. Therefore, the autonomous vehicle driving model produced by carrying out step S319 will be configured (or trained) to drive a full size vehicle on any road in a same or at least in a similar driving style or manner as that of the first driver. Stated otherwise, the autonomous driving model would be configured to drive a vehicle in a same or similar manner as the first driver would. Therefore, the autonomous vehicle driving model produced by carrying out step S319 can be used to operate a vehicle in a more human-like manner.

For example, if the physiological data of the first driver, obtained during step S313, indicates that the driver's heartbeat rate, blood pressure level, temperature, perspiration level, orientation of the head, etc., generally remain relatively stable or normal during while the first driver operates the RC vehicle 200 on a driving track, the first driver may be associated with a driving style that prioritizes a comfortable driving experience (e.g., a low stress driving experience). This is because a comfortable driving experience generally does not excite the driver (or passenger(s)) beyond a certain level. In this case, the autonomous vehicle driving model that results from carrying out step S319 would be configured to drive a vehicle (whether a full-sized vehicle on the road or a digital RC vehicle on a digital track) in a comfort mode.

Therefore, an operator of a full-sized vehicle wishing to operate the full-sized vehicle autonomously but in a human-like fashion and in a low stress causing mode, the operator may elect utilizing an autonomous vehicle driving model trained by the first driver (e.g., the first autonomous vehicle driving model).

Alternatively, when the first driver drives the RC vehicle 200 aggressively on the plurality of driving tracks, the autonomous vehicle driving model that results from the developing step S319 would be configured to drive a full-sized vehicle in an "aggressive" type of driving manner. When driving the RC vehicle 200 in the aggressive driving mode, the physiological data obtained from the at least one sensor 500 in step S313 may indicate, for example, a higher heartbeat rate of the driver when accelerating, decelerating, steering, etc., as compared to when driving the RC vehicle in the comfort mode.

While the terms "comfort" and "aggressive" may be somewhat subjective, the "aggressive" driving manner may include, generally speaking, driving faster than in the "comfort" mode, accelerating faster than in the "comfort" mode, decelerating faster than in the "comfort mode", etc.

Step S313 may include using the ECG sensor 510 to obtain the first driver's heartbeat rate, the PPG sensor piezoelectric silicon pressure sensor 520 to obtain the first driver's blood pressure level, the thermometer 530 to obtain the first driver's temperature, the humidity sensor 540 to detect the first's driver's perspiration level, the mmWave 550 sensor for determining an orientation of the head of the first driver, the camera 560 for tracking for tracking movements of the head or body of the first driver and/or a strain gauge sensor 570 for monitoring a respiration of the first driver.

In a first approach, (in the full autonomous driving mode), after step S319 has been carried out to develop the first autonomous vehicle driving model, the method of the present subject matter may include driving a full-sized vehicle on a driving track configured to fit full-sized vehicle thereon by using the first autonomous vehicle driving model. In this case, the driving of the full-sized vehicle is carried out in consideration of the driving style or manner of the first driver since the first driver was employed to train the first autonomous driving model.

In a second approach, after step S319 has been carried out, the method of the present subject matter may include presenting a driver of the full-sized vehicle an option to drive the full-sized vehicle in an autonomous mode (e.g., in a full autonomous mode) or in a semi-autonomous mode. When the driver selects the autonomous mode, the full-sized vehicle can be operated on a road, track, etc., based on the driving style or manner of the first driver since the first driver, as indicated in the first approach above. When the driver selects the semi-autonomous mode, the second approach may include:
  a) enabling the driver of the full-sized vehicle to drive the full-sized vehicle by operating a throttle pedal, a brake pedal and/or a steering wheel of the full sized vehicle;
  b) while the full-sized vehicle is operated, feeding input data received from the throttle pedal, the brake pedal and the steering wheel of the full-sized vehicle, as operated by the driver of the full-sized vehicle, to the first autonomous vehicle driving model, and
  c) using the first autonomous vehicle driving model to modify the input data received from the throttle pedal, the brake pedal and the steering wheel of the full-sized vehicle in consideration of the driving style or manner of the first driver such that a mode of driving the full-sized vehicle is a blend between a driving style of the driver of the full-sized vehicle and the driving style of the first driver, as used in developing the first autonomous vehicle driving model.

The semi-autonomous mode is a blended driving mode where the driver's throttle commands, braking commands and/or steering commands can be modified to a certain extent based on the driving style or preferences of the driver employed to develop the autonomous driving model being used. For example, when using the first autonomous driving model as described in this specification, the first autonomous vehicle driving model predicts the first driver to take turns smoothly, as a non-limiting example of a driving behavior of the first driver. In this case, when the driver of the full-sized vehicle jerks the steering wheel of the full-sized vehicle to make a sharp turn, as an example, the first autonomous vehicle driving model can be used to smoothen the steering of the full-sized vehicle such that the full-sized vehicle can be turned more smoothly than its driver intended, although not necessarily as smooth as the first driver would have turned the vehicle in the same driving circumstance.

In a third approach, after step S319 has been carried out, the method of the present subject matter may include creating a digital driving track, creating a digital vehicle, and driving the digital vehicle on the digital track in consideration of a driving style or manner of the first driver (since the first driver was employed to develop the first autonomous vehicle driving model in the example of FIG. 3).

In a fourth approach, after step S319 has been carried out, the method of the present subject matter may include presenting a driver of a digital vehicle with an option to drive the digital vehicle in a digital driving track in an autonomous mode or in a semi-autonomous mode.

In the fourth approach, when the driver selects the autonomous mode, the digital vehicle can be operated on a digital track based on the driving style or manner of the first driver since the first driver is the person employed in the example of FIG. 3 to develop the first autonomous vehicle driving model. When the driver selects the semi-autonomous mode, the fourth approach may include:
  a) enabling the driver of the digital vehicle to drive the digital RC vehicle by operating a throttle pedal, a brake pedal or a steering wheel commanding the digital vehicle (e.g., the throttle pedal 610, the brake pedal 620 and the steering wheel 630 can be used to operate the digital vehicle);
  b) while the digital vehicle is operated, feeding input data received from the throttle pedal, the brake pedal and the steering wheel commanding the digital vehicle, to the first autonomous vehicle driving model, and
  c) using the first autonomous vehicle driving model to modify the input data received from the throttle pedal, the brake pedal and the steering wheel commanding the digital vehicle in consideration of the driving style or manner of the first driver such that a mode of driving the digital vehicle is a blend between a driving style of the driver of the digital vehicle and the driving style of the first driver, as used in developing the first autonomous vehicle driving model.

Steps S301-S319 of the method of FIG. 3 can be repeated for a desired number of drivers to develop an autonomous vehicle driving model for each driver. For example, steps S301-S309 can be repeated for a second driver (driving the RC vehicle 200 on a plurality of driving track), by obtaining physiological data from the second driver by using the at least one physiological sensor 500 as described in this specification for the first driver, to develop a second autonomous vehicle driving model. The second autonomous vehicle driving model would be configured to drive a full-sized vehicle on a driving track or a digital vehicle on a digital track in consideration of the driving style or manner of the second driver.

The second driver may be different from the first driver. As such, the second driver may have a driving style or manner that is different from the driving style or manner of the first driver. Therefore, the second autonomous vehicle driving model may be configured to operate a full-sized vehicle differently from the first autonomous vehicle driving model.

In a fifth approach, when the first and second autonomous vehicle driving models described in this specification are developed, a method of the present subject matter may include:
a) presenting a user of the full-sized vehicle with an option to select the first autonomous vehicle driving model or the second autonomous vehicle driving model;
b) receiving input from the user, the input indicative of the user selecting one of the first and second autonomous vehicle driving models; and
c) utilizing the first autonomous vehicle driving model or the second autonomous vehicle driving model, based on the selection made by the user, to drive the full-sized vehicle.

In a sixth approach, when the first and second autonomous vehicle driving models are developed, a method of the present subject matter may include:
a) presenting a user of the digital vehicle with an option to select the first autonomous vehicle driving model or the second autonomous vehicle driving model;
b) receiving input from the user, the input indicative of the user selecting one of the first and second autonomous vehicle driving models; and
c) utilizing the first autonomous vehicle driving model or the second autonomous vehicle driving model, based on the selection made by the user, to drive the digital vehicle on a digital driving track.

Therefore, a plurality of different autonomous vehicle driving models can be created in accordance with the teachings of this specification. An operator of a full-sized vehicle can be presented with the option to select one of the created autonomous vehicle driving models (based on operator preference) and to select whether the operator wishes to operate the vehicle in a fully autonomous mode or in a semi-autonomous mode, as described in this specification.

In addition, an operator of a digital vehicle that is configured to be driven on a digital track can be provided with the option to select an autonomous vehicle driving model of preference, from among the plurality of available autonomous vehicle driving models, and to select whether the operator wishes to operate the digital vehicle in a fully autonomous mode or in a semi-autonomous mode.

While the present disclosure has been particularly shown and described with reference to exemplary embodiments thereof, it will be apparent to those of ordinary skill in the art that various changes in form and detail may be made therein without departing from the spirit and scope of the present disclosure as defined by the following claims.

What is claimed is:

1. An autonomous vehicle method, comprising:
driving a remote-controlled (RC) vehicle on a plurality of driving tracks by a first driver, the RC vehicle being smaller in size than a corresponding full-sized vehicle;
wherein, when the RC vehicle is driven on a driving track from among the plurality of driving tracks by the first driver, the method includes:
displaying the driving track being driven on to the first driver via a head-mountable display, the head-mountable display displaying video data obtained from a camera mounted on the RC vehicle;
controlling an acceleration of the RC vehicle via a throttle pedal remotely controlled by the first driver;
controlling a deceleration of the RC vehicle via a brake pedal remotely controlled by the first driver;
controlling a steering of the RC vehicle via a steering wheel remotely controlled by the first driver;
obtaining sensor data from the RC vehicle by using one or more of a proximity sensor, a localization sensor, an inertial measurement unit (IMU) sensor, a microphone and a force feedback sensor included in the RC vehicle;
obtaining physiological data from the first driver while the first driver drives the RC vehicle;
recording: the video data obtained from the camera mounted on the RC vehicle, a position of the throttle pedal and the acceleration of the RC vehicle, a position of the brake pedal and the deceleration of the RC vehicle, a position of the steering wheel, the obtained sensor data from the RC vehicle and the obtained physiological data to produce recorded information; and
scaling the recorded information by accounting for differences in physics or dynamics between the RC vehicle and the corresponding full-sized vehicle to produce full-sized vehicle parameter data; and
developing a first autonomous vehicle driving model by taking as input the produced recorded information and the produced full-sized vehicle parameter data, and correlating the acceleration of the RC vehicle via the throttle pedal, the deceleration of the RC vehicle via the brake pedal and the steering of the RC vehicle via the steering wheel with the obtained physiological data from the first driver and with the produced full-sized vehicle parameter data,
wherein the first autonomous vehicle driving model is configured to drive the full-sized vehicle on a full-sized driving track in consideration of a driving style or manner of the first driver, or
the first autonomous vehicle driving model is configured to drive a digital vehicle on a digital driving track in consideration of the driving style or manner of the first driver.

2. The method of claim 1, wherein the obtaining of the physiological data includes one or more of using an electrocardiography (ECG) sensor to obtain the first driver's heartbeat rate, a photoplethysmography (PPG) sensor or a piezoelectric silicon pressure sensor to obtain the first driver's blood pressure level, a thermometer to obtain the first driver's temperature, a humidity sensor to detect the first's driver's perspiration level, a millimeter wave (mmWave) sensor for determining an orientation of the head of the first driver, a camera for tracking for tracking movements of the head or body of the first driver and a strain gauge sensor for monitoring a respiration of the first driver.

3. The method of claim 1, further including driving the full-sized vehicle on the full-sized driving track by using the first autonomous vehicle driving model,
wherein the driving of the full-sized vehicle is carried out in consideration of the driving style or manner of the first driver by using the first autonomous vehicle driving model.

4. The method of claim 1, further comprising:
presenting a driver of the full-sized vehicle an option to drive the full-sized vehicle in an autonomous mode or in a semi-autonomous mode;
receiving a response by the driver of the full-sized vehicle, the response being indicative that the driver of the full-sized vehicle selects the semi-autonomous mode;

enabling the driver of the full-sized vehicle to drive the full-sized vehicle by operating at least one of a throttle pedal, a brake pedal and a steering wheel of the full sized vehicle;

while the full-sized vehicle is operated, feeding input data received from the throttle pedal, the brake pedal and the steering wheel of the full-sized vehicle, as operated by the driver of the full-sized vehicle, to the first autonomous vehicle driving model; and using the first autonomous vehicle driving model to modify the input data received from the throttle pedal, the brake pedal and the steering wheel of the full-sized vehicle in consideration of the driving style or manner of the first driver such that a mode of driving the full-sized vehicle is a blend between a driving style of the driver of the full-sized vehicle and the driving style of the first driver, as used in developing the first autonomous vehicle driving model.

5. The method of claim 1, further comprising creating the digital driving track and the digital vehicle, and driving the digital vehicle on the digital track in consideration of the driving style or manner of the first driver by using the first autonomous vehicle driving model.

6. The method of claim 1, further comprising:

presenting a driver of the digital vehicle an option to drive the RC vehicle in an autonomous mode or in a semi-autonomous mode;

receiving a response by the driver of the digital vehicle, the response being indicative that the driver of the digital vehicle selects the semi-autonomous mode;

enabling the driver of the digital vehicle to drive the digital vehicle by operating at least one of a throttle pedal, a brake pedal and a steering wheel commanding the digital vehicle;

while the digital vehicle is operated, feeding input data received from the throttle pedal, the brake pedal and the steering wheel commanding the digital vehicle, to the first autonomous vehicle driving model; and using the first autonomous vehicle driving model to modify the input data received from the throttle pedal, the brake pedal and the steering wheel commanding the digital vehicle in consideration of the driving style or manner of the first driver such that a mode of driving the digital vehicle is a blend between a driving style of the driver of the digital vehicle and the driving style of the first driver, as used in developing the first autonomous vehicle driving model.

7. The method of claim 1, further comprising driving the RC vehicle on the plurality of driving tracks by a second driver;

wherein, when the RC vehicle is driven on a driving track from among the plurality of driving tracks by the second driver, the method includes:

displaying the driving track being driven on to the second driver via the head-mountable display, the head-mountable display displaying video data obtained from a camera mounted on the RC vehicle;

controlling an acceleration of the RC vehicle via a throttle pedal remotely controlled by the second driver;

controlling a deceleration of the RC vehicle via a brake pedal remotely controlled by the second driver;

controlling a steering of the RC vehicle via a steering wheel remotely controlled by the second driver, the steering wheel including a motor or actuator configured to provide haptic feedback to the second driver based on the driving of the RC vehicle;

obtaining sensor data from the RC vehicle by using one or more of the proximity sensor, the localization sensor, the IMU sensor, and the force feedback sensor included in the RC vehicle;

obtaining physiological data from the second driver while the second driver drives the RC vehicle;

recording: the video data obtained from the camera mounted on the RC vehicle, a position of the throttle pedal and the acceleration of the RC vehicle, a position of the brake pedal and the deceleration of the RC vehicle, a position of the steering wheel, the obtained sensor data from the RC vehicle and the obtained physiological data of the second driver to produce recorded information for the second driver;

scaling the recorded information for the second driver by accounting for differences in physics or dynamics between the RC vehicle and the corresponding full-sized vehicle to produce full-sized vehicle parameter data; and developing a second autonomous vehicle driving model by taking as input the produced recorded information of the second driver and the produced full-sized vehicle parameter data, and correlating the acceleration of the RC vehicle via the throttle pedal, the deceleration of the RC vehicle via the brake pedal and the steering of the RC vehicle via the steering wheel with the obtained physiological data of the second driver and with the produced full-sized vehicle parameter data, wherein the second autonomous vehicle driving model is configured to drive the full-sized vehicle on the full-sized driving track in consideration of a driving style or manner of the second driver, or the second autonomous vehicle driving model is configured to drive the digital vehicle on the digital driving track in consideration of the driving style or manner of the second driver.

8. The method of claim 7, further comprising:

presenting a user of the full-sized vehicle with an option to select the first autonomous vehicle driving model or the second autonomous vehicle driving model;

receiving input from the user of the full-sized vehicle, the input indicative of the user of the full-sized vehicle selecting one of the first and the second autonomous vehicle driving models; and utilizing the first autonomous vehicle driving model or the second autonomous vehicle driving model, based on the selection made by the user of the full-sized vehicle, to drive the full-sized vehicle.

9. The method of claim 7, further comprising:

presenting a user of the digital vehicle with an option to select the first autonomous vehicle driving model or the second autonomous vehicle driving model;

receiving input from the user of the digital vehicle, the input indicative of the user of the digital vehicle selecting one of the first and the second autonomous vehicle driving models; and utilizing the first autonomous vehicle driving model or the second autonomous vehicle driving model, based on the selection made by the user of the digital vehicle, to drive the digital vehicle on the digital driving track.

10. The method of claim 1, wherein the scaling of the recorded information includes scaling the plurality of driving tracks based on a size difference between the RC vehicle and the corresponding full-sized vehicle, or scaling forces that would impact the corresponding full-sized vehicle when the full-sized vehicle is driven like the RC vehicle.

11. An autonomous vehicle system, comprising:
a processor;
a remote-controlled (RC) vehicle, the RC vehicle being smaller in size than a corresponding full-sized vehicle;
a camera mounted to the RC vehicle;
at least one sensor selected from the group consisting of a proximity sensor, a localization sensor, an inertial measurement unit (IMU) sensor, a force feedback sensor and a microphone included in the RC vehicle;
a head-mountable display configured to be worn by a first driver, the head-mountable display being configured to display video data obtained from the camera;
at least one physiological sensor configured to obtain physiological data from the first driver;
a throttle pedal, a brake pedal and a steering wheel located remotely from the RC vehicle and configured to operate the RC vehicle; and
a non-transitory, tangible program storage medium, embodying a program of instructions executable by the processor to perform method steps for autonomous vehicular operation, the method steps comprising:
driving the RC vehicle on a plurality of driving tracks by the first driver, wherein, when the RC vehicle is driven on a driving track from among the plurality of driving tracks by the first driver, the method includes:
 displaying the driving track being driven on to the first driver via the head-mountable display, the head-mountable display displaying video data obtained from the camera mounted to the RC vehicle;
 controlling an acceleration of the RC vehicle via the throttle pedal remotely controlled by the first driver;
 controlling a deceleration of the RC vehicle via the brake pedal remotely controlled by the first driver;
 controlling a steering of the RC vehicle via the steering wheel remotely controlled by the first driver;
 obtaining sensor data from the RC vehicle by using at least one selected from the group consisting of the proximity sensor, the localization sensor, the IMU sensor, the force feedback sensor and the microphone;
 obtaining physiological data of the first driver while the first driver drives the RC vehicle by using the at least one physiological sensor;
 recording: the video data obtained from the camera mounted to the RC vehicle, a position of the throttle pedal and the acceleration of the RC vehicle, a position of the brake pedal and the deceleration of the RC vehicle, a position of the steering wheel, the obtained sensor data from the RC vehicle and the obtained physiological data to produce recorded information; and
 scaling the recorded information by accounting for differences in physics or dynamics between the RC vehicle and the corresponding full-sized vehicle to produce full-sized vehicle parameter data; and
developing a first autonomous vehicle driving model by taking as input the produced recorded information and the produced full-sized vehicle parameter data, and correlating the acceleration of the RC vehicle via the throttle pedal, the deceleration of the RC vehicle via the brake pedal and the steering of the RC vehicle via the steering wheel with the obtained physiological data from the first driver and with the produced full-sized vehicle parameter data,
wherein the first autonomous vehicle driving model is configured to drive the full-sized vehicle on a full-sized driving track in consideration of a driving style or manner of the first driver, or
the first autonomous vehicle driving model is configured to drive a digital vehicle on a digital driving track in consideration of the driving style or manner of the first driver.

12. The system of claim 11, wherein the physiological sensors include at least one selected from the group consisting of an electrocardiography (ECG) sensor to obtain the first driver's heartbeat rate, a photoplethysmography (PPG) sensor or a piezoelectric silicon pressure sensor to obtain the first driver's blood pressure level, a thermometer to obtain the first driver's temperature, a humidity sensor to detect the first's driver's perspiration level, a millimeter wave (mm-Wave) sensor for determining an orientation of the head of the first driver, a camera for tracking for tracking movements of the head or body of the first driver, and a strain gauge sensor for monitoring a respiration of the first driver.

13. The system of claim 11, wherein the method further includes driving the full-sized vehicle on the full-sized driving track by using the first autonomous vehicle driving model,
 wherein the driving of the full-sized vehicle is carried out in consideration of the driving style or manner of the first driver by using the first autonomous vehicle driving model.

14. The system of claim 11, wherein the method further includes:
 presenting a driver of the full-sized vehicle an option to drive the full-sized vehicle in an autonomous mode or in a semi-autonomous mode;
 receiving a response by the driver of the full-sized vehicle, the response being indicative that the driver of the full-sized vehicle selects the semi-autonomous mode;
 enabling the driver of the full-sized vehicle to drive the full-sized vehicle by operating at least one of a throttle pedal, a brake pedal and a steering wheel of the full-sized vehicle; and
 while the full-sized vehicle is operated, feeding input data received from the throttle pedal, the brake pedal and the steering wheel of said full-sized vehicle, as operated by the driver of the full-sized vehicle, to the first autonomous vehicle driving model, and
 using the first autonomous vehicle driving model to modify the input data received from the throttle pedal, the brake pedal and the steering wheel of the full-sized vehicle in consideration of the driving style or manner of the first driver such that a mode of driving the full-sized vehicle is a blend between a driving style of the driver of the full-sized vehicle and the driving style of the first driver, as used in developing the first autonomous vehicle driving model.

15. The system of claim 11, wherein the method further comprises:
 creating the digital driving track and the digital vehicle, and
 driving the digital vehicle on the digital track in consideration of a driving style or manner of the first driver by using the first autonomous vehicle driving model.

16. The system of claim 11, wherein the method further comprises:
 presenting a driver of the digital vehicle an option to drive the digital vehicle in an autonomous mode or in a semi-autonomous mode;

receiving a response by the driver of the digital vehicle, the response being indicative that the driver of the digital vehicle selects the semi-autonomous mode;

enabling the driver of the digital vehicle to drive the digital vehicle by operating at least one of a throttle pedal, a brake pedal and a steering wheel commanding the digital vehicle; and while the digital vehicle is operated, feeding input data received from the throttle pedal, the brake pedal and the steering wheel commanding the digital vehicle, to the first autonomous vehicle driving model, and using the first autonomous vehicle driving model to modify the input data received from the throttle pedal, the brake pedal and the steering wheel commanding the digital vehicle in consideration of the driving style or manner of the first driver such that a mode of driving the digital vehicle is a blend between a driving style of the driver of the digital vehicle and the driving style of the first driver, as used in developing the autonomous vehicle driving mode.

17. The system of claim 11, wherein the method further includes:

driving the RC vehicle on the plurality of driving tracks by a second driver;

wherein, when the RC vehicle is driven on a driving track from among the plurality of driving tracks by the second driver, the method includes:

displaying the driving track being driven on to the second driver via the head-mountable display;

controlling an acceleration of the RC vehicle via the throttle pedal;

controlling a deceleration of the RC vehicle via the brake pedal;

controlling a steering of the RC vehicle via the steering wheel, the steering wheel including a motor or actuator configured to provide haptic feedback to the second driver based on the driving of the RC vehicle;

obtaining sensor data from the RC vehicle by using one or more of the proximity sensor, the localization sensor, the IMU sensor, and the force feedback sensor included in the RC vehicle;

obtaining physiological data from the second driver while the second driver drives the RC vehicle;

recording: the video data obtained from the camera mounted on the RC vehicle, a position of the throttle pedal and the acceleration of the RC vehicle, a position of the brake pedal and the deceleration of the RC vehicle, a position of the steering wheel, the obtained sensor data from the RC vehicle and the obtained physiological data of the second driver to produce recorded information for the second driver;

scaling the recorded information for the second driver by accounting for differences in physics or dynamics between the RC vehicle and the corresponding full-sized vehicle to produce full-sized vehicle parameters, wherein the scaling of the recorded information includes scaling the plurality of driving tracks based on a size difference between the RC vehicle and the full-sized vehicle, or scaling forces that would impact the full-sized vehicle when the full-sized vehicle is driven like the RC vehicle; and developing a second autonomous vehicle driving model by taking as input the produced recorded information of the second driver and the produced full-sized vehicle parameters, and correlating the acceleration of the RC vehicle via the throttle pedal, the deceleration of the RC vehicle via the brake pedal and the steering of the RC vehicle via the steering wheel with the obtained physiological data of the second driver and with the produced full-sized vehicle parameters, wherein the second autonomous vehicle driving model is configured to drive the full-sized vehicle on a full-sized driving track in consideration of a driving style or manner of the second driver, or the second autonomous vehicle driving model is configured to drive the digital vehicle on a digital driving track in consideration of the driving style or manner of the second driver.

18. The system of claim 17, wherein the method further includes:

presenting a user of the full-sized vehicle with an option to select the first autonomous vehicle driving model or the second autonomous vehicle driving model;

receiving input from the user, the input indicative of the user selecting one of the first and the second autonomous vehicle driving models; and utilizing the first autonomous vehicle driving model or the second autonomous vehicle driving model, based on the selection made by the user, to drive the full-sized vehicle.

19. The system of claim 17, wherein the method further comprises:

presenting a user of the digital vehicle with an option to select the first autonomous vehicle driving model or the second autonomous vehicle driving model;

receiving input from the user, the input indicative of the user selecting one of the first and the second autonomous vehicle driving models; and utilizing the first autonomous vehicle driving model or the second autonomous vehicle driving model, based on the selection made by the user, to drive the digital vehicle on the digital driving track.

* * * * *